Figure 1:
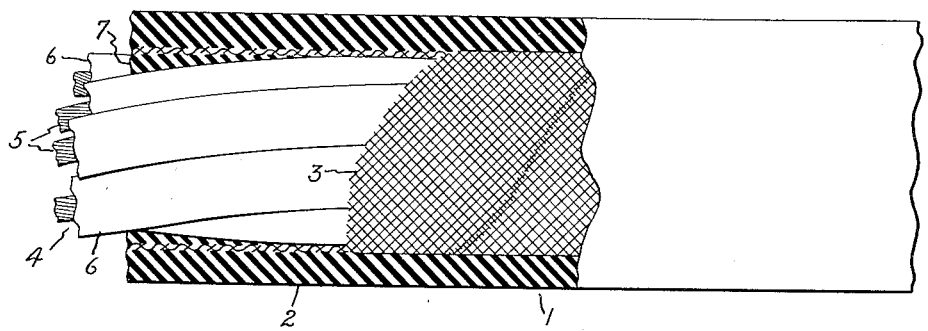

Sept. 20, 1955    R. O. SHEPP    2,718,544
JACKETED MULTIPLE CONDUCTOR CABLE
Filed Sept. 9, 1950

Inventor:
Robert O. Shepp,
by
His Attorney.

United States Patent Office 2,718,544
Patented Sept. 20, 1955

2,718,544

JACKETED MULTIPLE CONDUCTOR CABLE

Robert O. Shepp, Fairfield, Conn., assignor to General Electric Company, a corporation of New York Application September 9, 1950, Serial No. 184,048

2 Claims. (Cl. 174—113)

This invention relates to a multiple conductor cable encased in a thermosetting or thermoplastic jacket or sheath.

In a multi-conductor rubber type coated cable, it is common to position a plurality of individual insulated conductors within a rubber type sheath. The insulated conductors are usually helically wound around one another or "cabled" to provide a compact cable. To protect these cabled conductors from the elements, or from moisture if they be installed underground, it is common to enclose them in a sheath of rubber or other thermosetting insulation.

When multi-conductors are thus cabled, a plurality of interstices exist between the individual electrical conductors and the surrounding sheath. It is desirable to fill these interstices to provide a stronger, more durable cable. In the past, it has been common to extrude rubber strips or to provide jute fillers to occupy these interstices, whereupon a cotton binder was tightly wrapped around the structure and the cotton was then coated with rubber, neoprene, or the like. Such a construction made for an expensive structure, yet rubber was desirable in preference to the jute, since in underground installations the rubber, unlike the jute, would be non-hygroscopic.

In the manufacture of such multiconductor cable, it is common to have the individual conductors covered with a thin sheet of colored neoprene (coated for circuit identification). Means for stripping the rubber sheathing from the cable to give access to said colored conductors is necessary to provide for the connection of the cable in a circuit. There is obviously, then still need in the art for a cheaper, more durable cable having rubber or neoprene filled interstices including means for simplifying the stripping of the outer sheath to provide for the connection of said cable.

It is an object of this invention to provide a new type of filler for the interstices surrounding the multi-conductors of a rubber type sheathed cable.

It is a further object of this invention to provide a new and improved means for securing said rubber type sheath about the individual conductors.

It is a further object of this invention to provide a combined outer protective insulating coating and filler that may be stripped easily to expose the individual conductors of a cable for the electric connection of the same.

It is a further object of this invention to provide a cable having a combined reinforced outer protective insulating coating and filler that may be stripped without damaging the individual insulated conductors.

It is a further object of this invention to provide a combined cable jacket and filler which indicates the proper depth of cut for stripping the cable.

It is a still further object of this invention to provide a new and improved multi-conductor cable of the rubber sheathed type in which no separate filler strips are required.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

Briefly, in accordance with a preferred embodiment of my invention, the individual conductors of a multi-conductor cable are wrapped with an open-meshed, woven glass fabric and coated with a sheath of rubber, neoprene, or thermoplastic, whereupon the sheath material is extruded through the openings of said woven glass to fill the interstices provided by the plurality of conductors.

Figure 2:
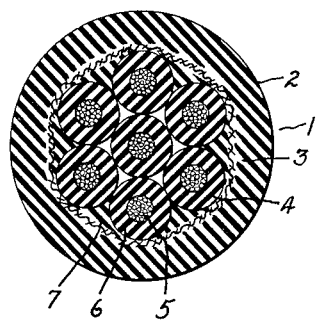

In the drawing, Fig. 1 is a top elevation view, partially cut away, of a multi-conductor cable provided with this new type sheathing; while Fig. 2 is a cross section view through line 2—2 of Fig. 1.

Referring to the drawing, a multi-conductor cable 1 is shown comprising an outer neoprene sheath 2 and a woven glass insulating strip 3 positioned to separate said sheath from a plurality of individual conductors 4, each of which comprises a central conductor 5 and an insulating sheath 6. The positioning of the individual conductors 5 within the sheath provides a plurality of interstices 7 which are filled with the same material as that of the external sheath 2.

The external sheath 2 is preferably of a thermosetting elastomeric material such as neoprene, which expands during curing, but thermoplastic materials may also be used. The woven glass mesh 3 is more particularly described in a copending application, Eugene L. Crandall et al., Serial No. 140,470, filed January 25, 1950, and assigned to the same assignee as that of the present invention. Briefly, this glass mesh is analogous to a wire screen and has a prefixed number of strands per inch. For example, there may be 10 or 20 strands per inch in either direction in the glass screening. These dimensions are not critical and do not reflect on the scope of this invention. However, a relatively open mesh weave should be used. The woven glass mesh 3 is treated with a neoprene cement before it is ever applied to the conductors. The primary purpose of this is to make it possible for the neoprene sheath 2 to adhere to the glass mesh. Other reasons for using the cement are to set the weave, to protect the glass fibers from abrasion against each other where the threads cross each other, and to prevent the distortion of the weave in subsequent handling of the tape.

The individual conductors 5 are preferably coated with a layer of neoprene or other thermosetting insulation 6 and frequently are colored to provide a coding scheme to facilitate the connection of the cable in a circuit.

The interstices 7 are filled with the same material as that of the sheath 2 and the interstitial fillers are integral with the sheath. Specifically, when the glass mesh is wound around the individual conductors, interstices 7 are formed which are voids which would destroy the composition and strength of the cable. By extruding a neoprene sheath about the woven glass, however, some of the insulation passes through the openings of the woven mesh to partially fill the interstices. Then, as the sheathing, which in a preferred embodiment might be neoprene, is cured, the curing heat expands the neoprene, causing it to completely fill the interstices. For example, in one embodiment, a treatment is provided which is effective, though not critical. Specifically, the multi-conductors 5, wrapped with the woven glass fabric 3, are covered by neoprene by extrusion which partially fills the interstices 7 between juxtapositioned conductors 4 and the woven glass. When the neoprene is cured, however, the heat used in the curing process expands the neoprene, forcing it through the mesh of the woven screen to cause the expanded neoprene to intimately fill all the interstices. The lead forming sheath used in this process is a mere mold, and is stripped off after curing is completed. Consequently, it is not being depended upon to form a novel element of this invention. For example, the sheath 2 may be cured by steam pressure or by no external source at all, such as when thermoplastic sheaths are used which require no cure. Usually, in this instance, however, a vinyl-like treated woven glass tape would be used.

The glass tape which has been previously mentioned is a tough fibrous material which does not deteriorate with age as does the cotton tape type binding.

In one embodiment of this invention, 15 mesh woven glass strips 13/16" wide were applied to a plurality of electrical conductors with an overlap in the helical winding of about 3/16". The woven glass tape accomplishes the desired results for the following reasons. Specifically, the woven glass mesh, in addition to allowing for the extrusion of the insulation material therethrough and thereby eliminating the need for separate filler strips as heretofore required, provides for the separation of the jacket insulation from the individual conductors and thus restricts the amount of contact between the external sheath and the individual conductor to prevent the sheath from sticking to the conductors, and to provide for the easy removal of the external sheath 2 from the individual conductors 4 for splicing or making connections.

In one particular embodiment of this invention, to prevent the sticking of the sheath to the individual conductors 4, the latter are run through finely-divided mica dust prior to the application of the glass mesh. With the treating of the individual conductors with the mica dust, the sheath 2, during curing, is prevented from sticking to the individual conductors; consequently, the stripping off of the outer sheathing is facilitated while providing a strong substantial cable.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. An electric cable comprising a plurality of insulated conductors having a non-adherent surface stranded together in side by side relation to provide a compact core at the surface of which are longitudinally extending interstices between adjacent conductors substantially triangular in cross-section, an open mesh woven covering of glass yarns applied directly on said core whereby said yarns are in direct contact with the insulated conductors except over said interstices, and an outer insulating sheath over said woven glass yarn covering which sheath extends through the openings between the glass yarns and fills the triangular-shaped longitudinally extending interstices and adheres to the glass yarns, whereby the outer sheath is only lightly bonded to the insulation of the conductors to make the stripping of the outer sheath from the cable relatively easy.

2. An electric cable comprising a plurality of insulated conductors having a non-adherent surface stranded together in side by side relation to provide a compact core at the surface of which are longitudinally extending interstices between adjacent conductors substantially triangular in cross-section, an open mesh glass yarn tape tightly wound directly on said core whereby the glass yarns are in direct contact with the insulated conductors except over said interstices, and an elastomeric insulating sheath over said glass yarn tape which sheath extends through the openings between the glass yarns and fills the triangular-shaped longitudinally extending interstices and adheres to the glass yarns, whereby said sheath is only lightly bonded to the insulation of the conductors to make the stripping of the entire elastomeric insulating sheath structure from the cable relatively easy.

References Cited in the file of this patent

UNITED STATES PATENTS

| | | |
|---|---|---|
| 369,593 | Dalzell | Sept. 6, 1887 |
| 1,977,209 | Sargent | Oct. 16, 1934 |
| 2,155,060 | Phillips | Apr. 18, 1939 |
| 2,162,953 | Lattin | June 20, 1939 |
| 2,260,761 | Wilkoff | Oct. 28, 1941 |
| 2,390,039 | Slayter et al. | Nov. 27, 1945 |
| 2,391,931 | Swartz et al. | Jan. 1, 1946 |
| 2,397,082 | Barker | Mar. 26, 1946 |
| 2,520,991 | Yolles | Sept. 5, 1950 |
| 2,544,233 | Kennedy | Mar. 6, 1951 |

FOREIGN PATENTS

| | | |
|---|---|---|
| 403,371 | Great Britain | Dec. 13, 1933 |
| 558,033 | Great Britain | Dec. 16, 1943 |